Feb. 3, 1970  
E. H. KAY  
3,493,832  
SCR MOTOR CONTROL SYSTEMS WITH SWITCH FOR  
SELECTING TWO SPEED RANGES  
Filed Dec. 29, 1967

*INVENTOR.*
Edward H. Kay

BY

*Marshall J. Breen*
ATTORNEY

Witness

*Rosalind Tsai*

United States Patent Office 3,493,832
Patented Feb. 3, 1970

3,493,832
SCR MOTOR CONTROL SYSTEMS WITH SWITCH FOR SELECTING TWO SPEED RANGES
Edward H. Kay, Stockholm, N.J., assignor to The Singer Company, New York, N.Y., a corporation of New Jersey
Filed Dec. 29, 1967, Ser. No. 694,679
Int. Cl. H02p 7/38
U.S. Cl. 318—251    2 Claims

ABSTRACT OF THE DISCLOSURE

A motor speed control system of the type having an operator-actuated controller for variably gating an SCR furnishing power current to a series commutator motor such as used for instance in a sewing machine, and in which the back E.M.F. of the motor armature regulates the speed set by the controller, includes a switch for selectively switching a free-wheeling diode in and out of shunt circuit relation with the motor series field winding. With the diode switched out of shunt relation with the field winding, a first speed range for controller actuation is obtained. With the diode switched into shunt relation with the field winding, a second speed range substantially lower than said first speed range is obtained for the same controller actuation.

---

This invention relates generally to motor speed control systems using an operator-actuated speed controller to variably gate a silicon controlled rectifier (SCR) into conduction for controlling the power current to the motor, and more especially relates to circuit means in such systems for selecting distinctly different motor speed ranges effective for the same actuation of the speed controller.

BACKGROUND OF THE INVENTION

I am aware of the list United States expired Patent No. 2,262,616 which discloses a switch mounted on a sewing machine for selecting different tapped portions of the motor field winding whereby different speed ranges for the motor may be effected. I am also aware of the Hamlett United States Patent No. 3,319,591 which discloses a speed control system for a sewing machine in which a potentiometer mounted on the sewing machine may be adjusted by the operator to variably limit the top speed of the driving motor, which motor is controlled by a silicon controlled rectifier (SCR). The rationale of the Hamlett invention is to use the adjustable potentiometer as a variable shunt for the controller resistance to limit the maximum gate voltage available for firing the SCR at the full speed position of the controller.

The above systems depend upon internal changes in the motor winding where tapping is involved or upon running long extra leads to the remote controller to variably shunt the controller resistance by an adjustable element mounted on the sewing machine. Both of these prior art expedients are undesirable particularly from a parts and assembly cost standpoint.

It would therefore be extremely advantageous, particularly in the highly competitive sewing machine industry as an example, to provide a simple low-cost circuit means for effecting selection of different speed ranges for an SCR-controlled motor and particularly one which does not have the undesirable limitations of the known prior art arrangements pointed out above.

Accordingly it is an object of this invention to provide an improved circuit means for selecting substantially different speed ranges for an SCR controlled motor. It is a further object of this invention to provide circuit means for accomplishing the above function, which means comprises low-cost components which are easy to install.

It is still another object of this invention to provide circuit means comprising only two simple conventional components which when added to prior art circuitry in a specific manner enable operator selection of distinctly different motor speed ranges.

SUMMARY OF THE INVENTION

In carrying out the above objects, I provide a switch and diode preferably mounted near to the motor, which motor may be controlled by an SCR controller located remotely from the motor. Electrical connections are provided between the switch, the diode and the motor field winding so that the diode can be selectively connected in shunt circuit relation with the field winding and of a polarity to permit forward current to continue to flow in said field winding even after the SCR stops conducting in each cycle of input voltage, whereby the field flux is increased and a substantially different speed range may be selectively obtained for a given adjustment of the controller as compared to the unshunted condition of the field winding.

BRIEF DESCRIPTION OF THE DRAWINGS

The subject matter which I regard as my invention is particularly pointed out and distinctly claimed in the concluding portion of this specification. My invention, itself, however both as to its organization and method of operation, together with further objects and advantages thereof may best be understood by reference to the following description taken in connection with the accompanying drawings:

DESCRIPTION OF THE PREFERRED EMBODIMENT

Figure 2:
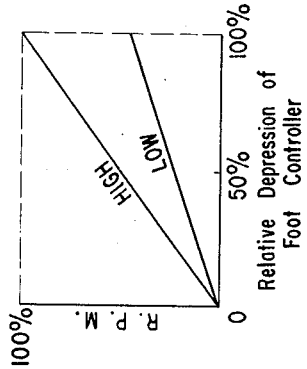
FIGURE 2 is a graphical representation of the motor speed as a function of controller actuation and shows the substantially different speed ranges selectively obtainable in accordance with the present invention.
Figure 1:
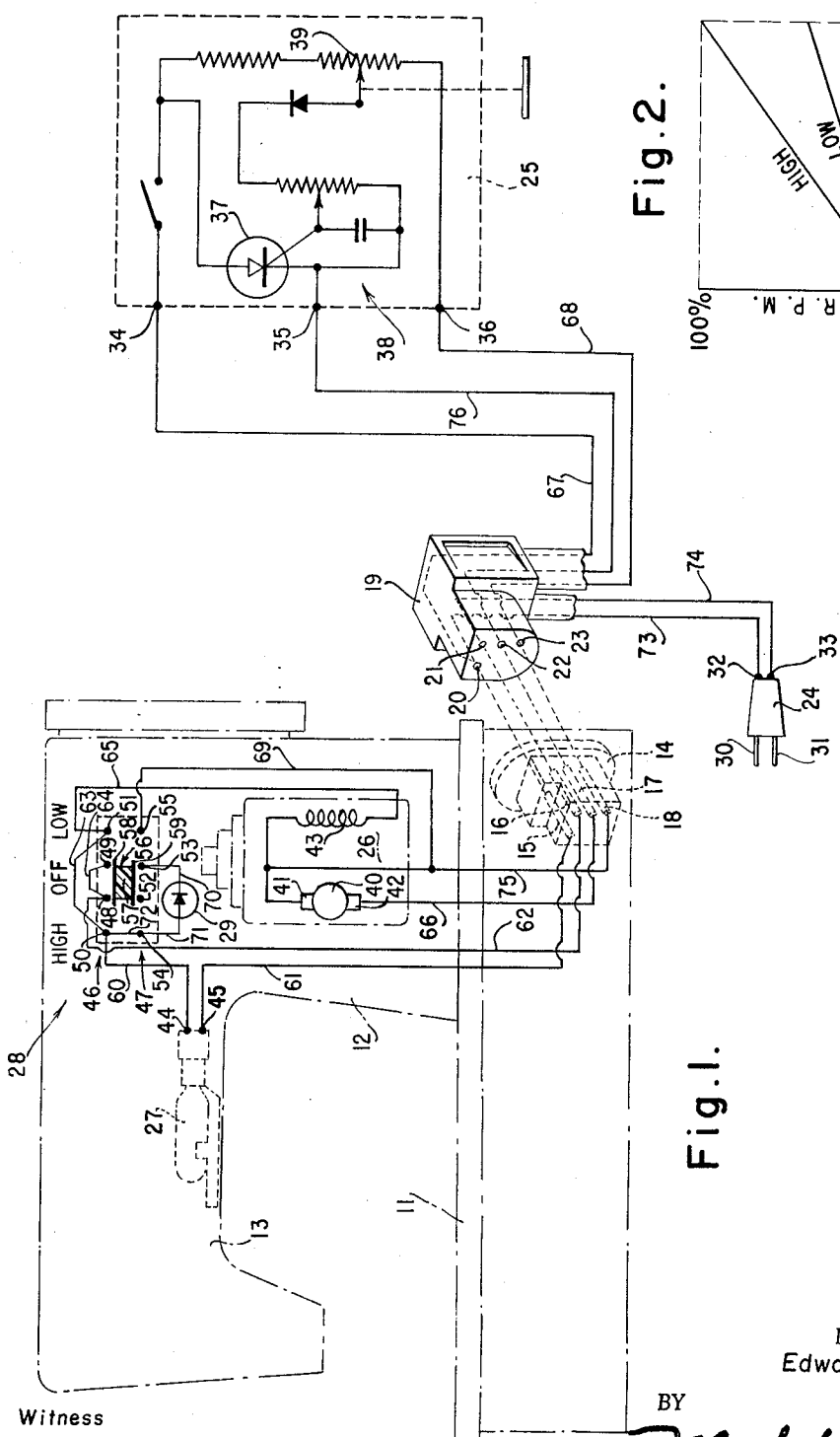
FIGURE 1 is a diagrammatic view of a sewing machine having an SCR controller for controlling the speed of a driving electric motor and having a diode switching circuit constructed in accordance with one form of the present invention.

With reference to the drawings, the diode switching circuit of the present invention is shown embodied in an SCR motor control system for a sewing machine having a frame including a work supporting bed 11, a hollow standard 12 rising from one end of the bed, and a bracket arm 13 at the top of the standard overhanging the bed. A receptacle 14 having first, second, third and fourth prongs 15, 16, 17 and 18 is mounted in the standard-end of the bed to receive a mating detachable plug 19 having first, second, third and fourth contacts 20, 21, 22 and 23 corresponding to the first, second, third and fourth prongs of the receptacle.

A sewing machine motor and lamp control circuit includes the following elements: a conventional plug 24 for connecting to a source of alternating current (not shown), a motor controller 25 which is of the type disclosed in the copending United States patent application of Thompson et al. Ser. No. 494,703, filed Oct. 11, 1965, a conventional series motor 26 mounted in the hollow standard, a lamp 27 of the type disclosed in a United States patent of Cook et al. No. 3,176,121, granted Mar. 30, 1965 and mounted in the bracket arm, a double-pole double-throw switch 28 mounted in the top of the standard, and a half-wave rectifier in the form of a diode 29 also mounted in the top of the standard and preferably on the switch 28.

The plug 24 has first and second prongs 30 and 31 and first and second terminals 32 and 33 corresponding to the first and second prongs. The foot controller 25 has first, second and third terminals 34, 35 and 36, a semiconductor controlled rectifier 37, a gate cathode circuit indicated generally at 38, and manually-adjustable impedance means 39. A complete description of the foot controller can be obtained from the aforementioned copending United States patent application Ser. No. 494,703. The motor 26 has an armature winding 40, first and second brushes 41 and 42 and a field winding 43. The lamp 27 has first and second terminals 44 and 45. The double-pole double-throw switch 28 of the slide type has first and second poles 46 and 47 and off, high speed, and low speed positions corresponding to three selectable positions of a sliding member 56. The first pole of the switch has first and second center contacts 48 and 45, one contact 50 corresponding to the high speed position, and one contact 51 corresponding to the low speed position. The second pole of the switch has first and second center contacts 52 and 53, one contact 44 corresponding to the high speed position, and one contact 55 corresponding to the low speed position. A sliding member 56 is sandwiched between the first and second poles of the switch. The sliding member has an insulator 57 sandwiched between first and second conducting contacts 58 and 59 corresponding respectively to the first and second poles of the switch.

The elements of the motor and lamp control circuit of the invention are electrically interconnected in the following manner. A lead 60 is connected between the contact 50 of the switch and the first terminal 44 of the lamp 27. A lead 61 is connected between the second termnal 45 of the lamp and the prong 15, thence through receptacle 14 and plug 19 by way of lead 73 to terminal 32 of plug 24. A lead 62 is connected between the contact 48 and the prong 16, thence through receptacle 14 and plug 19 by way of lead 74 to terminal 33 of plug 24. A lead 63 is connected between the contacts 50 and 51. A lead 64 is connected between the center contacts 48 and 49.

A lead 65 is connected between the contact 51 and the field winding 43 of the motor. A lead 66 is connected between the brush 42 of the motor and prong 17, thence through receptacle 14 and plug 19 and by way of lead 76 to the terminal 35 of the foot controller 25. A lead 67 is connected between the terminal 34 of the foot controller and thence, through plug 19 and by way of lead 73 to terminal 32.

A lead 68 is connected between the terminal 36 of the foot controller, thence through plug 19 and receptacle 14 by way of lead 75 to the brush 41 of the motor 26. A lead 69 is connected between the lead 75 and the contact 55 of the switch 28. The diode 29 is connected by leads 70 and 71 respectively to contacts 53 and 54 of the switch 28.

In operation, assuming that the plug 24 is connected to the source of alternating current (not shown), when the sliding member 56 of the switch is in the center or off position as shown, the lamp 27 cannot light because there is an open circuit between the contacts 48 and 50 in the loop represented by the leads 60, 61, 73, 74 and 62. There is also an open circuit between the contacts 48 and 51 and contacts 49 and 51 in the loop represented by the leads 64, 62, 74, 73, 67, 76, 66 and 65, and thus, even when the foot controller 25 is actuated, the motor can not run.

However, when the sliding member 56 of the switch is in the high speed position, the lamp will light because the contact 58 of the sliding member of the switch bridges the gap between the contacts 48 and 50 and closes the circuit in the loop represented by the leads 60, 61, 73, 74 and 62. In addition, the contact 58 of the sliding member of the switch bridges the gap between contacts 48 and 50 and closes the circuit in the loop represented by the leads 62, 74, 73, 67, 76, 66, 65 and 63 so that the motor will run when the foot controller is actuated.

When the sliding member 56 of the switch is in the low speed position, the lamp will light because the contact 58 of the sliding member of the switch bridges the gap between the contacts 49 and 51 of the switch and closes the circuit in the loop represented by the leads 63, 60, 61, 73, 74, 62 and 64. In addition, the second contact 59 of the sliding member of the switch bridges the gap between contacts 53 and 55 and places the diode 29 in shunt with the field winding 43 of the motor through the leads 69, 65, 63, 72, 71, and 70. Also, bridging of contacts 49 and 51 provides closure of the loop represented by leads 64, 62, 74, 73, 67, 76, 66 and 65 and permits energization of the motor 26 under control of the foot controller 25.

When the sliding member 56 of the switch is in its low speed position, the diode 29, by means of its shunt circuit with relation to the field winding 43, permits forward current to flow in the field winding of the motor even after the SCR 37 in the foot controller 25 stops conducting during each cycle. The foregoing flow of current causes increased field flux in contrast to the circuit without the diode in shunt relation with the field winding. The armature 40 rotating in the increased field flux, generates a larger back E.M.F., which is transmitted to the gate-cathode control circuit 38 as negative bias in opposition to the positive bias provided by the manually-adjustable impedance means 39 in the foot controller. Therefore, the semiconductor controlled rectifier 37 conducts later in the cycle than in the circuit without the shunt diode to provide lower voltage and hence a lower speed range which is adjustable by the manually-adjustable impedance means 39.

The curves of FIGURE 2 show the motor speed as a function of the controller actuation and indicate the two substantially different speed ranges that may be obtained by the teachings of the present invention. The curve marked "high" is obtained with the sliding member 56 of the switch 28 placed in the high speed position above described and the curved marked "low" shows the substantially lower speed range obtainable when the sliding member 56 is placed in the low speed position. It is clear that, in the low speed position of switch 28 the motor speed variation for a given controller actuation is substantially less than in the high speed position of switch 28. In other words, the controller is less sensitive with respect to speed change when the switch 28 is in its low speed position and this means that the operator can control low sewing speeds substantially better in the low speed position of switch 28 and need resort to the high speed position only when straight-away sewing at high speeds is needed.

It is important to note the extremely simple circuit modification required according to the present invention which establishes two substantially different speed ranges by the expedient of *selectively* placing a back diode in shunt circuit relation with the field winding of a series motor which is fed from A.C. voltage through an SCR.

It is further to be noted that the diode 29 may be a physically small unit because of the light current duty required of it in this circuit. For example, the diode is back biased during the time when the SCR conducts and thus does not carry current during that period.

Further, the diode 29 and the switch 28 may be pre-assembled to form a unitary switching module having four leads 60, 62, 65 and 69 for external connection with the other circuit components and this greatly facilitates the assembly in a modern sewing machine where internal space is already substantially taken up by the closely-packed sewing mechanisms.

Although the invention has been described in its preferred form with a certain degree of particularity, it is understood that the present disclosure of the preferred form has been made by way of example and that numerous changes in the details of construction and the combination and arrangement of parts can be resorted to without departing from the spirit and the scope of the invention.

Having thus set forth the nature of the invention, what is claimed is:

1. In a speed control system for an electric motor having series connected armature and field windings fed from an A.C. supply, a semiconductor controlled rectifier having an anode-cathode circuit connected in series with said armature and field windings, a gate-cathode control circuit, a signal channel including the motor armature for transmitting to said gate-cathode control circuit the back E.M.F. of the motor as negative bias therefor, manually-adjustable impedance means for producing a selected reference signal in series opposition to said motor back E.M.F. whereby the algebraic sum of the back E.M.F. and the reference signal is supplied to the gate-cathode control circuit, a diode, and switch means for selectively connecting the diode in shunt circuit relation with said field winding and of a polarity to permit forward current to flow in said field winding after the semiconductor controlled rectifier stops conducting in each cycle, whereby substantially different motor speed ranges may be selectively obtained for a given adjustment of said manually-adjustable impedance means.

2. In a speed control system for an electric motor having series connected armature and field windings fed from an A.C. supply, a semiconductor controlled rectifier having an anode-cathode circuit connected in series with said armature and field windings, a gate-cathode control circuit, a signal channel including the motor armature for transmitting to said gate-cathode control circuit the back E.M.F. of the motor as negative bias therefor, manually adjustable impedance means for producing a selected reference signal in series opposition to said motor back E.M.F. whereby the algebraic sum of the back E.M.F. and the reference signal is supplied to the gate-cathode control circuit, a diode, and manual means for variably effecting the shunting of said diode across the field winding with a polarity to permit forward current to flow in said field winding after the semiconductor controlled rectifier stops conducting in each cycle, whereby different motor speed ranges may be selectively obtained for a given adjustment of said manually-adjustable impedance means.

References Cited

UNITED STATES PATENTS

| 3,286,150 | 11/1966 | Wilson et al. | 318—246 |
| 3,319,591 | 5/1967 | Hamlett | 318—246 |
| 3,360,705 | 12/1967 | Morris | 318—246 |
| 3,377,536 | 4/1968 | Bacquart | 318—331 |

ORIS L. RADER, Primary Examiner

K. L. CROSSON, Assistant Examiner

U.S. Cl. X.R.

318—305, 331, 357